(12) United States Patent
Sendelbach et al.

(10) Patent No.: US 7,594,677 B2
(45) Date of Patent: Sep. 29, 2009

(54) GAS BAG FOR A CAR PASSENGER-PROTECTING SYSTEM

(75) Inventors: Hans-Peter Sendelbach, Senden (DE); Thomas Sievers, Ulm (DE); Patrick A. David, Ulm (DE); Martin Breuninger, Neu-Ulm/Pfuhl (DE)

(73) Assignee: Takata Corporation, Tokyo (JP)

( * ) Notice: Subject to any disclaimer, the term of this patent is extended or adjusted under 35 U.S.C. 154(b) by 192 days.

(21) Appl. No.: 10/537,709

(22) PCT Filed: Nov. 19, 2003

(86) PCT No.: PCT/DE03/03863

§ 371 (c)(1),
(2), (4) Date: Feb. 6, 2006

(87) PCT Pub. No.: WO2004/050434

PCT Pub. Date: Jun. 17, 2004

(65) Prior Publication Data

US 2006/0145459 A1    Jul. 6, 2006

(30) Foreign Application Priority Data

Dec. 3, 2002  (DE) ............................... 102 57 168

(51) Int. Cl.
*B60R 21/207*  (2006.01)
*B60R 21/21*  (2006.01)
(52) U.S. Cl. .................. 280/743.1; 280/730.2; 280/729
(58) Field of Classification Search ............. 280/743.1, 280/729, 730.2
See application file for complete search history.

(56) References Cited

U.S. PATENT DOCUMENTS

| | | | |
|---|---|---|---|
| 5,586,782 A * | 12/1996 | Zimmerman et al. | 280/730.2 |
| 5,765,863 A * | 6/1998 | Storey et al. | 280/729 |
| 5,829,779 A | 11/1998 | Nakashima et al. | |
| 5,927,750 A | 7/1999 | Nakamura et al. | |
| 6,062,594 A | 5/2000 | Asano et al. | |
| 6,155,598 A | 12/2000 | Kutchey | |
| 6,224,092 B1 * | 5/2001 | Sakamoto et al. | 280/730.2 |
| 6,250,676 B1 | 6/2001 | Werstat et al. | |
| 6,260,878 B1 | 7/2001 | Tanase | |
| 6,270,113 B1 | 8/2001 | Wipasuramonton et al. | |
| 6,283,499 B1 | 9/2001 | Nelsen et al. | |
| 6,371,518 B1 | 4/2002 | Kalandek et al. | |
| 6,616,587 B2 | 9/2003 | Kleeberger et al. | |
| 2001/0011812 A1 | 8/2001 | Seki et al. | |

(Continued)

FOREIGN PATENT DOCUMENTS

DE    197 14 267 A1    11/1997

(Continued)

*Primary Examiner*—John Q. Nguyen
*Assistant Examiner*—Karen Amores
(74) *Attorney, Agent, or Firm*—Foley & Lardner LLP

(57) ABSTRACT

The invention relates a gas bag (5) which is used for a car passenger-protecting system and comprises a gas generator (20) in which at least a part of the envelop of the bag sac is incorporated in the remaining segment of the envelop of the gas bag. The aim of said invention is to obtain a target positioning of said gas bag prior to blowing it. For this purpose, the segment of the envelop (10) forms a narrow filling channel (15) which extends in a predefined discharge direction (70) and can be connected to the gas generator.

30 Claims, 10 Drawing Sheets

U.S. PATENT DOCUMENTS

| | | | |
|---|---|---|---|
| 2001/0015549 A1 | 8/2001 | Yamaji et al. | |
| 2004/0150199 A1* | 8/2004 | Hofmann | 280/730.2 |
| 2007/0284859 A1* | 12/2007 | Kashiwagi | 280/730.2 |
| 2007/0290488 A1* | 12/2007 | Taguchi et al. | 280/730.2 |

FOREIGN PATENT DOCUMENTS

| | | |
|---|---|---|
| DE | 196 48 654 A1 | 5/1998 |
| DE | 197 25 559 A1 | 12/1998 |
| DE | 100 41 042 A1 | 5/2001 |
| DE | 100 20 677 A1 | 10/2001 |
| EP | 0 940 301 A1 | 9/1999 |
| EP | 0 967 126 A1 | 12/1999 |
| EP | 1249 374 A2 | 10/2002 |
| GB | 2 318 767 A | 5/1998 |
| GB | 2 322 338 A | 8/1998 |
| JP | 9-323605 | 12/1997 |
| JP | 10-297409 | 11/1998 |
| JP | 11-059312 | 3/1999 |
| JP | 2000-507526 | 6/2000 |
| JP | 2001-171468 | 6/2001 |

\* cited by examiner

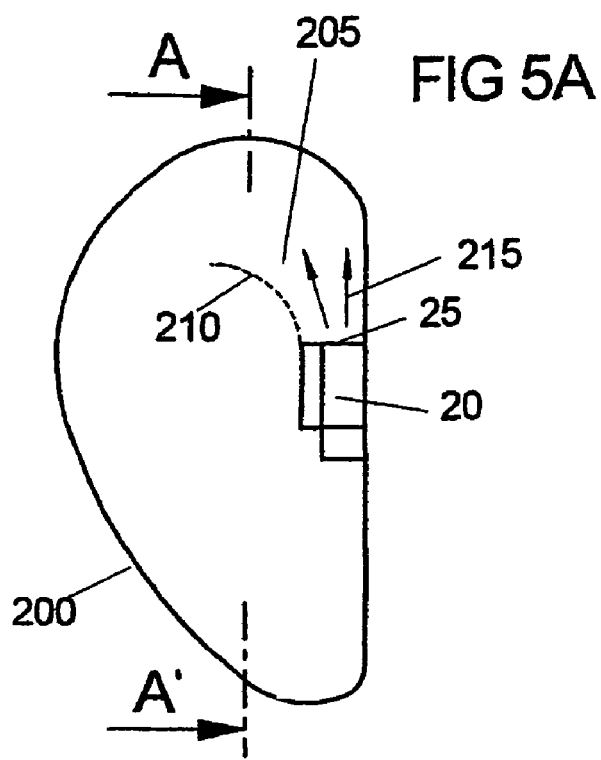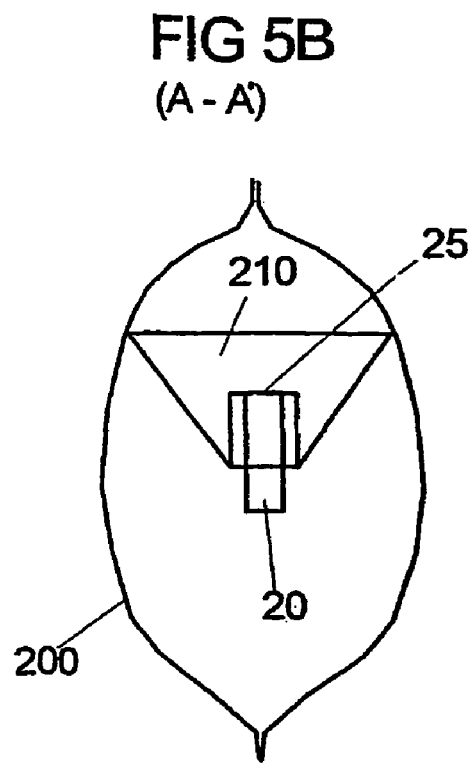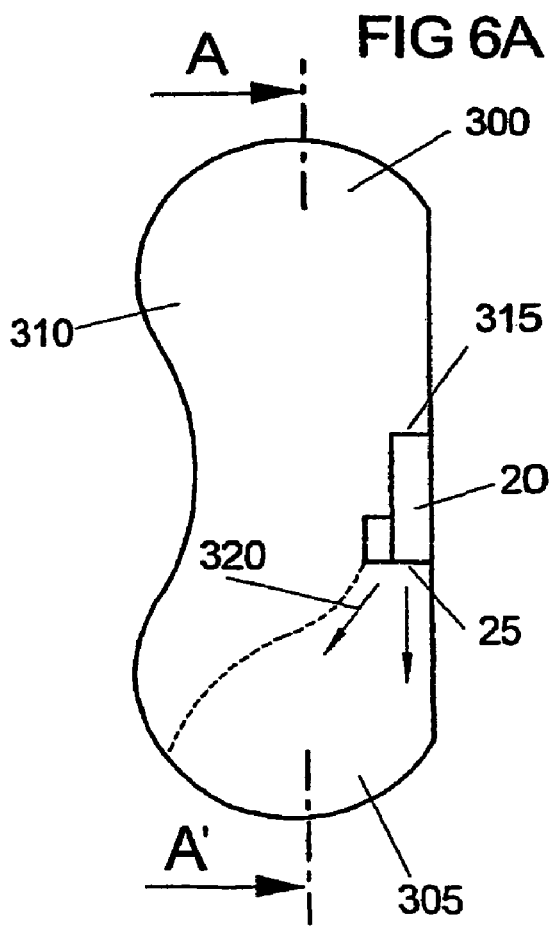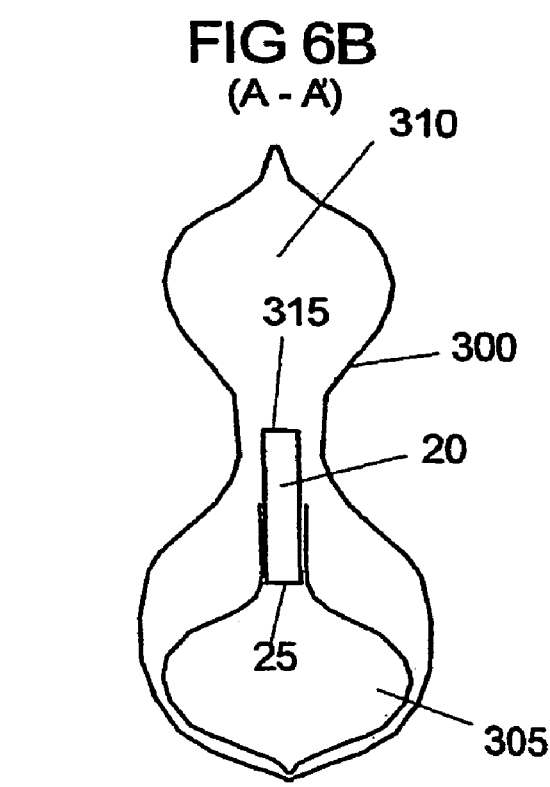

GAS BAG FOR A CAR PASSENGER-PROTECTING SYSTEM

BACKGROUND OF THE INVENTION

The present invention relates to a gas bag for a car passenger-protecting system.

A gas bag of this type is disclosed by the British laid-open specification 2 318 767. in this previously known gas bag, an upper part of the gas bag envelope is turned back into a lower part of the gas bag envelope. As a result of turning back the gas bag parts into one another in the previously known gas bag, the gas bag unfolds in a predefined manner or in a predefined sequence with respect to the individual gas bag envelope sections. In practical terms, when the previously known gas bag is inflated, first of all the lower part of the gas bag envelope is inflated. Only when the lower part of the gas bag envelope has unfolded is the upper, folded-back part of the gas bag envelope forced out of the lower part of the gas bag envelope on account of the gas pressure, which means that time-delayed inflation of the upper part of the gas bag envelope is achieved.

SUMMARY OF THE INVENTION

The invention is based on the object of specifying a gas bag for a car passenger-protecting system in which specific positioning of the gas bag or a part thereof is achieved before inflation.

According to the invention, a narrow filling channel is understood to mean a filling channel which is longer in the deployment direction than it is wide in cross section.

A substantial advantage of the gas bag according to the invention is to be seen in the fact that it has a preferential direction when inflated. In practical terms, the part of the gas bag envelope that is turned back into the filling channel is, so to speak, shot out of the filling channel during inflation. According to the invention, this is achieved by means of the narrow filling channel, which predefines a preferential direction or a shooting-out direction. This is because, when the gas generator is triggered, a relatively high pressure is built up in the filling channel in a relatively short time. The envelope material that is turned back is expelled from the filling channel on account of this high pressure and unfolds in the predefined deployment direction, which corresponds to the longitudinal direction of the narrow filling channel, because of the directed ejection impulse. In other words, by providing the narrow filling channel, specific positioning of the gas bag or a part thereof is achieved, in that the gas bag or a part of the gas bag is shot out of the filling channel specifically in a predefined direction.

In order to achieve the situation where the gas pressure generated by the gas generator is preferably used to eject the turned-back part of the gas bag envelope, it is seen as advantageous if the filling channel is or can be connected directly to the gas generator.

According to an advantageous refinement of the gas bag according to the invention, provision is made for the gas bag to be connected to one end of the filling channel and for the turned-back part of the gas bag envelope to be located immediately in front of the connection point of the gas generator. In this advantageous refinement of the gas bag according to the invention, the turned-back part of the gas bag envelope is therefore located immediately in front of a gas exit opening from the gas generator, which means that a particularly high ejection impulse is exerted on the turned-back gas bag envelope, which leads to particularly rapid unfolding of the gas bag envelope in the predefined deployment direction.

According to another advantageous refinement of the gas bag according to the invention, provision is made for the filling channel to form a lateral pocket, which extends laterally beside the connection point of the gas generator. The connection point of the gas generator is therefore located in the front part of the filling channel.

Part of the gas bag envelope can be inserted into the filling channel particularly simply by the gas bag envelope being stuffed into the filling channel unfolded.

In order to achieve unfolding of the gas bag envelope in a predefined manner, it is seen as advantageous if the turned-back part of the gas bag envelope is, at least to some extent, zigzag folded, pleated and/or rolled together.

In this case, unfolding of the gas bag envelope along the predefined deployment direction may then advantageously be achieved if the turned-back region of the gas bag envelope is zigzag-folded, pleated and/or rolled together at the end of the envelope facing away from the filling channel, the zigzag-folded, pleated and/or rolled together envelope pack is folded together at least once, forming an envelope pack with a U-shaped cross section, and the U-shaped envelope pack is pushed into the filling channel.

Otherwise, it is seen as advantageous if the gas bag has two or more gas bag chambers. In this case, at least one of the gas bag chambers can be an inner gas bag chamber, which is surrounded by an outer gas bag chamber of the gas bag.

In the gas bag according to the invention, the filling channel can be formed in different ways. It is seen as advantageous if the filling channel is formed laterally, at least partly, by means of a seam in the gas bag envelope.

Instead, if the gas bag has a plurality of gas bag chambers, the filling channel can be formed, at least partly, by side walls of an inner gas bag chamber.

Furthermore, the filling channel can advantageously be formed by a diffuser layer fitted in the gas bag and/or by retaining straps.

In order to ensure that the part of the gas bag envelope turned back into the filling channel unfolds along the predefined deployment direction, it is seen as advantageous if the filling channel is at least partly tubular. At least at its open channel end, the cross section of the filling channel can then widen like a funnel, in order to simplify turning back or pushing in the envelope pack when folding the gas bag together.

Furthermore, it is seen as advantageous if the gas bag according to the invention is what is known as a pelvis-thorax air bag or gas bag. Such a pelvis-thorax gas bag is advantageously fitted in a backrest of a motor vehicle seat, the predefined deployment direction of the filling channel extending parallel to the backrest of the motor vehicle seat, in the direction of the vehicle seat area.

Otherwise, it is seen as advantageous if the gas bag according to the invention is what is known as a head-thorax gas bag. In order then to achieve the situation where the head region of the head-thorax gas bag moves into the predefined position particularly quickly, it is seen as advantageous if the gas bag is fitted in a backrest of a motor vehicle seat in such a way that the predefined deployment direction of the filling channel extends parallel to the backrest, in the direction of the vehicle roof.

The gas bag can advantageously also be a head-thorax-pelvis gas bag. In this case, the head region and/or the pelvis region of the gas bag can in each case be turned back into a filling channel. There can also be two filling channels.

In addition, in the case of a head-thorax-pelvis gas bag, it is seen as advantageous if the gas bag is fitted in a backrest of a motor vehicle seat in such a way that the predefined deployment direction of the filling channel for the head region extends parallel to the backrest of the motor vehicle seat, in the direction of the vehicle roof, and/or the predefined deployment direction of the filling channel for the pelvis region extends parallel to the backrest of the motor vehicle seat, in the direction of the vehicle seat area. Both the pelvis region and the head region in each case advantageously have an appropriately oriented filling channel or shot channel.

The invention also relates to a method for folding a gas bag.

In order to achieve specific positioning of the gas bag or parts of the gas bag before inflation in such a method, the invention provides for the gas bag to be folded in such a way that part of the gas bag envelope is inserted into a narrow filling channel, formed by part of the gas bag envelope, which extends along a predefined deployment direction.

The turned-back or inserted part of the gas bag envelope can in this case be stuffed into the filling channel unfolded.

In order to ensure defined unfolding of the gas bag, however, it is seen as advantageous if the part of the gas bag envelope that is turned back is, at least partly, zigzag folded, pleated and/or rolled together.

Particularly rapid unfolding of the gas bag envelope is then advantageously achieved if the turned-back region at the end of the envelope facing away from the filling channel is firstly zigzag folded, pleated and/or rolled together, the zigzag folded, pleated and/or rolled together envelope pack is then firstly folded together once, forming an envelope pack with a U-shaped cross section and the U-shaped envelope pack is then pushed into the filling channel.

BRIEF DESCRIPTION OF THE DRAWINGS

FIG. 5a shows a sectional view of a gas bag according to a third exemplary embodiment of the present invention.

FIG. 5b shows a sectional view of a gas bag according to a third exemplary embodiment of the present invention.

FIG. 6a shows a sectional view of a gas bag according to a fourth exemplary embodiment of the present invention.

FIG. 6b shows a sectional view of a gas bag according to a fourth exemplary embodiment of the present invention.

DETAILED DESCRIPTION

Figure 1A:
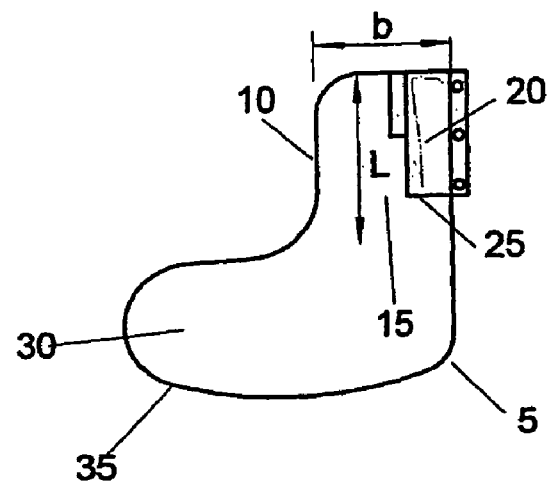
FIG. 1a shows a sectional view of a gas bag according to a first exemplary embodiment of the present invention.

In the figures, the same designations are used for identical or comparable components.

FIGS. 1a to 1d show a first exemplary embodiment of a gas bag 5 according to the invention. It is possible to see an envelope section 10 which forms a filling channel 15. The length L of the filling channel is in this case greater than the width b or the diameter b of the filling channel 15. Connected to the filling channel 15 is a gas generator 20, which can feed gas into the gas bag 5 at a gas outlet opening 25 or a starting point of the gas generator.

Figure 1B:
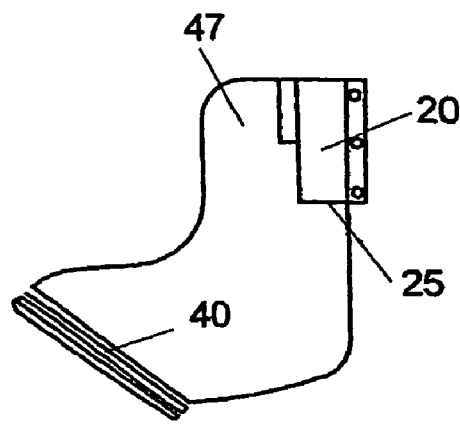
FIG. 1b shows a sectional view of a gas bag according to a first exemplary embodiment of the present invention.
Figure 1C:
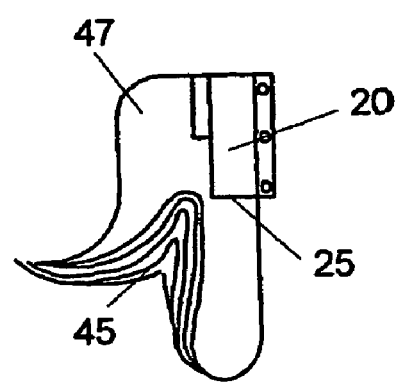
FIG. 1c shows a sectional view of a gas bag according to a first exemplary embodiment of the present invention.
Figure 1D:
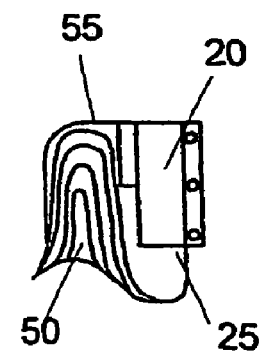
FIG. 1d shows a sectional view of a gas bag according to a first exemplary embodiment of the present invention.

In FIGS. 1b to 1d it is shown in detail how the gas bag envelope 30 of the gas bag 5 is folded together. First of all, the end 35 of the envelope facing the filling channel 15 is, for example, zigzag folded, rolled or pleated. In the following text, zigzag folding will be assumed by way of example. In this case, a zigzag-folded envelope pack 40 is produced, as can be seen well in FIG. 1b. The zigzag-folded envelope 40 is then folded together or laid together in the middle, which produces a U-shaped envelope pack 45. The U-shaped envelope pack 45 can be seen well in FIG. 1c.

The U-shaped envelope pack 45 is then inserted or pushed or stuffed into the envelope section 10 and thus into the filling channel 15.

As can be seen in FIGS. 1a to 1d, the filling channel 15 is located laterally beside the gas generator and forms a type of side pocket 47. The gas outlet opening 25 of the gas generator 20 is in this case located in the front region 50 of the filling channel 15, that is to say at the end facing away from the closed end 55 of the filling channel 15.

FIGS. 2a to 2d show how the gas bag according to FIGS. 1a to 1d unfolds. Following an activation of the gas generator 20, a high positive pressure forms in the region 60, which leads to the U-shaped envelope pack 45 shooting out. In practical terms, the U-shaped envelope pack 45 is drawn out of the filling channel 15 in the region 65 of the gas bag envelope.

Figure 2A:
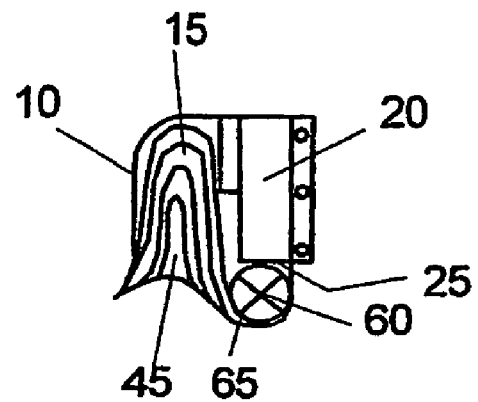
FIG. 2a shows a sectional view of a gas bag according to a first exemplary embodiment of the present invention.
Figure 2B:
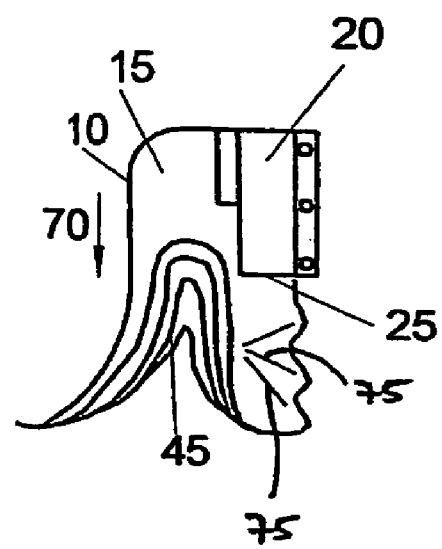
FIG. 2b shows a sectional view of a gas bag according to a first exemplary embodiment of the present invention.
Figure 2C:
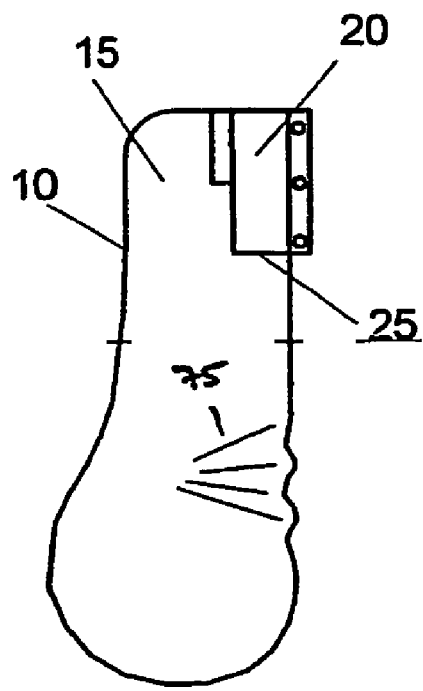
FIG. 2c shows a sectional view of a gas bag according to a first exemplary embodiment of the present invention.
Figure 2D:
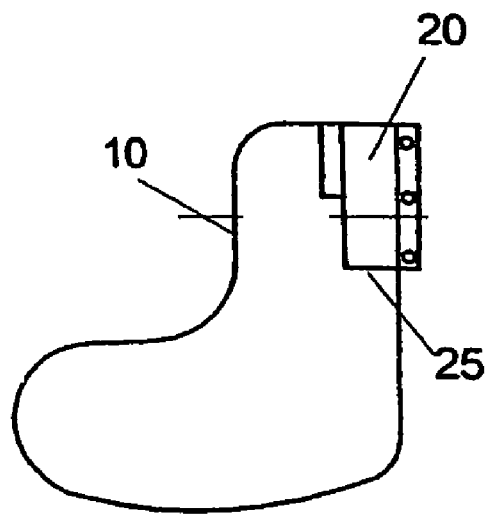
FIG. 2d shows a sectional view of a gas bag according to a first exemplary embodiment of the present invention.
Figure 3A:
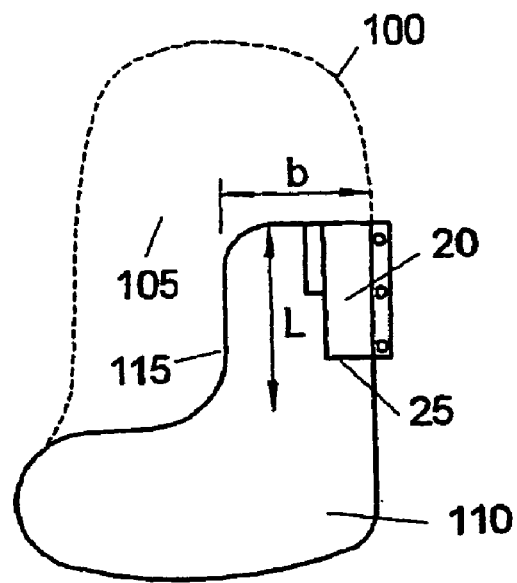
FIG. 3a shows a sectional view of a gas bag according to a second exemplary embodiment of the present invention.
Figure 3B:
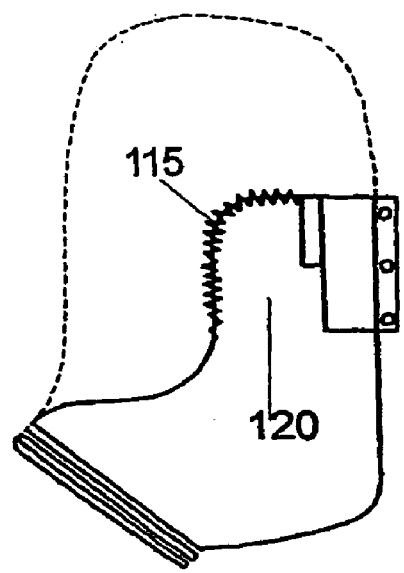
FIG. 3b shows a sectional view of a gas bag according to a second exemplary embodiment of the present invention.
Figure 3C:
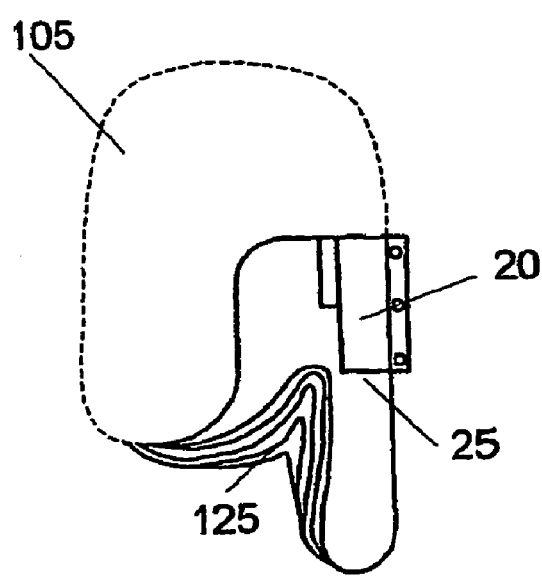
FIG. 3c shows a sectional view of a gas bag according to a second exemplary embodiment of the present invention.
Figure 3D:
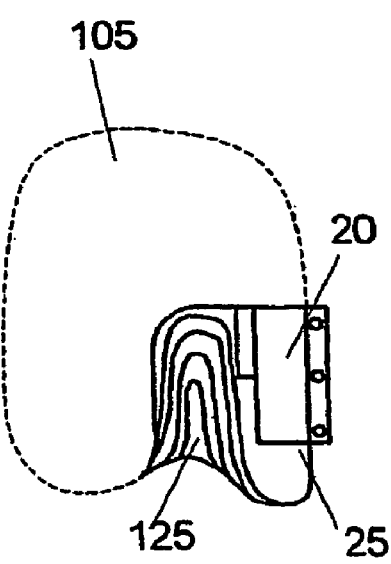
FIG. 3d shows a sectional view of a gas bag according to a second exemplary embodiment of the present invention.
Figure 4A:
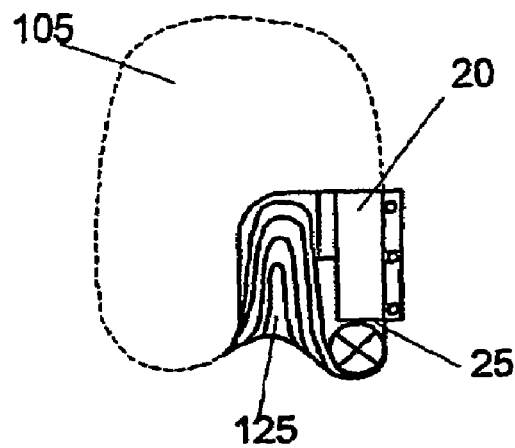
FIG. 4a shows a sectional view of a gas bag according to a second exemplary embodiment of the present invention.
Figure 4B:
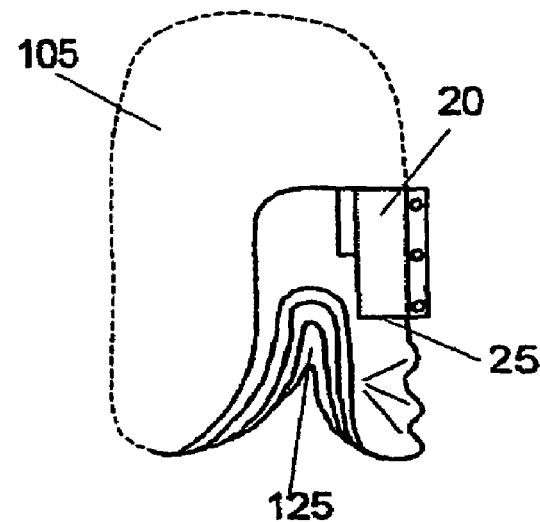
FIG. 4b shows a sectional view of a gas bag according to a second exemplary embodiment of the present invention.
Figure 4C:
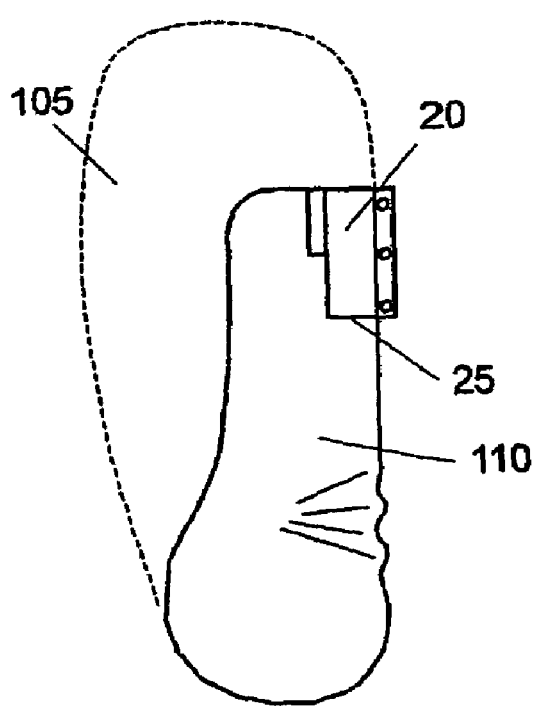
FIG. 4c shows a sectional view of a gas bag according to a second exemplary embodiment of the present invention.
Figure 4D:
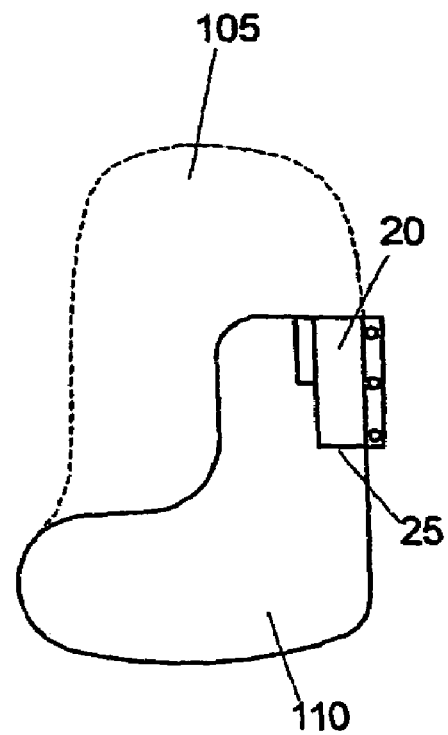
FIG. 4d shows a sectional view of a gas bag according to a second exemplary embodiment of the present invention.

On account of the filling channel 15 and the orientation of the filling channel 15, a predefined deployment direction 70 is predefined. FIGS. 2b to 2c reveal folds 75 on account of an accumulation of material. These folds 75 are unfolded only when the envelope pack 45 has been shot dynamically out of the filling channel 15 and the dynamics of the mass components have equalized, so that the gas bag 10 reaches its final shape on account of the tailoring of the material.

A second exemplary embodiment of a gas bag according to the invention, which is, for example, a head-thorax gas bag, is illustrated in FIGS. 3a to 3d and 4a to 4d. The gas bag 100 has two gas bag chambers 105 and 110, which are separated from each other by a separating point, for example a separating seam 115. By means of the separating seam 115, a filling channel 120, in which the envelope material of the lower gas bag chamber 110 is pushed as a U-shaped envelope pack 125, is formed in the lower gas bag chamber 110.

In the gas bag 100, the lower gas bag chamber 105 forms the pelvis chamber and the upper gas bag chamber 110 forms the thorax chamber.

With regard to the folding of the lower gas bag chamber 110 and with regard to the unfolding operation in the lower gas bag chamber 110, reference should be made to the explanations in connection with FIGS. 1a to 1d and 2a to 2d, since the lower gas bag chamber 110 is folded substantially in the same way as the gas bag 5 according to FIGS. 1a to 1d and 2a to 2d, so that it unfolds in a comparable manner to the gas bag 5.

The upper gas bag chamber 105 can be inflated directly by the gas generator 20; this presupposes that there is an appropriate connection between the upper gas bag chamber 105 and the gas generator 20. Instead, the upper gas bag chamber 105 can also be inflated indirectly via the lower gas bag chamber 110; this then presupposes appropriate transfer openings between the two gas bag chambers 105 and 110.

A third exemplary embodiment of a gas bag according to the invention is shown in FIGS. 5a and 5b. This gas bag 200 can be, for example, a head-thorax gas bag.

In the gas bag 200, a filling channel 205 is formed by a diffuser layer 210. Instead of the diffuser layer 210 or in addition to this, restraining straps can also be used to form the filling channel 205.

In FIGS. 5a and 5b, arrows 215 indicate how gas emerges from the gas generator 20 at the gas outlet opening 25 and penetrates into the filling channel 205.

FIG. 5b shows the gas bag 200 according to FIG. 5a in section along the section plane AA'.

The part of the gas bag envelope adjacent to the filling channel in the gas bag 200 forms the head region of the air bag; the remaining envelope region the thorax region.

A fourth exemplary embodiment of a gas bag according to the invention is shown in FIGS. 6a and 6b. The gas bag 300, which can be a pelvis-thorax gas bag, has two gas bag chambers 305 and 310. In this case, the lower gas bag chamber 305 forms the pelvis region of the gas bag, the upper gas bag chamber 310 the thorax region.

The gas generator 20 fills the lower gas bag chamber 305 at its gas outlet opening 305 and the upper gas bag chamber 310 at a further gas outlet opening 315.

The lower gas bag chamber 305 becomes narrower toward the region of the gas outlet opening 25 and thus forms a filling channel 320, into which both the envelope material of the lower chamber 305 and the envelope material of the upper chamber 310 can be turned as the gas bag is folded together.

FIG. 6b shows the gas bag 300 in a section along the section line AA'.

Figure 7A:
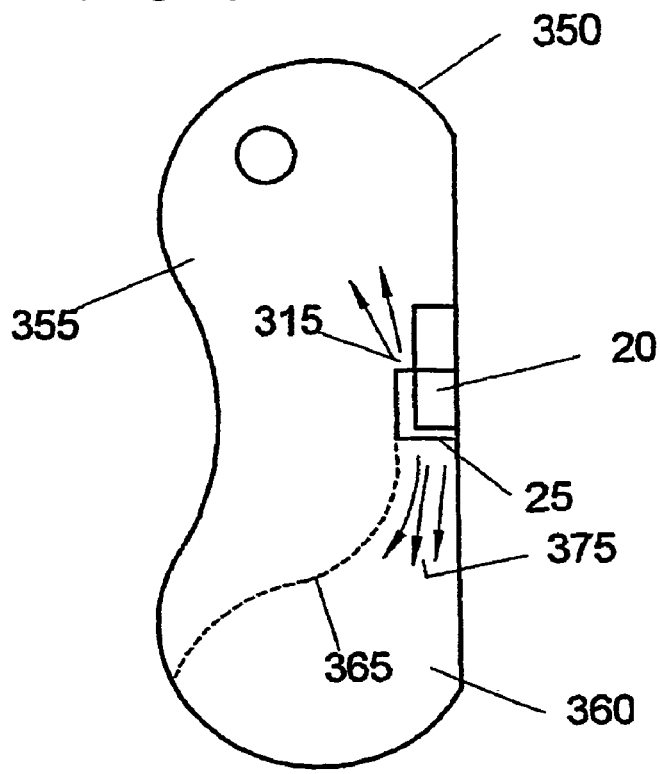
FIG. 7a shows a sectional view of a gas bag according to a fifth exemplary embodiment of the present invention.
Figure 7B:
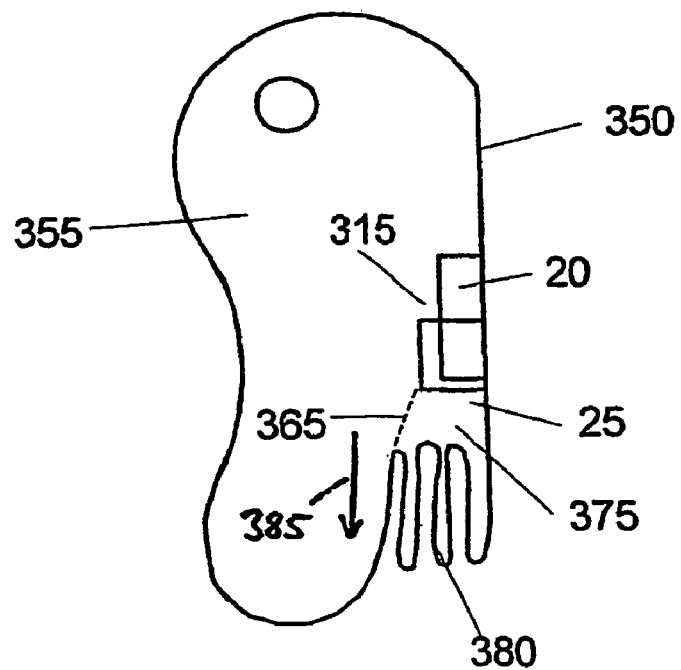
FIG. 7b shows a sectional view of a gas bag according to a fifth exemplary embodiment of the present invention.

FIGS. 7a and 7b show a fifth exemplary embodiment of a gas bag according to the invention. FIG. 7a shows the gas bag 350 in the inflated state and FIG. 7b shows the gas bag in the partly folded-together state.

The gas bag 350 has two gas bag chambers 355 and 360, which are separated from each other by a seam 365. The gas generator 20 with its two gas outlet openings 25 and 315 inflates the two gas bag chambers 355 and 360 separately.

By means of the seam 365, a filling channel 375 is formed in the lower gas bag chamber 360, into which the envelope material of the lower gas bag chamber 360 is pushed or turned as a zigzag-folded envelope pack 380. In this case, the envelope pack 380 is arranged immediately in front of the gas outlet opening 25, so that the gas stream from the gas generator 20 so to speak shoots or catapults the envelope pack 380 out of the filling channel 375 along the deployment direction 385.

Figure 8A:
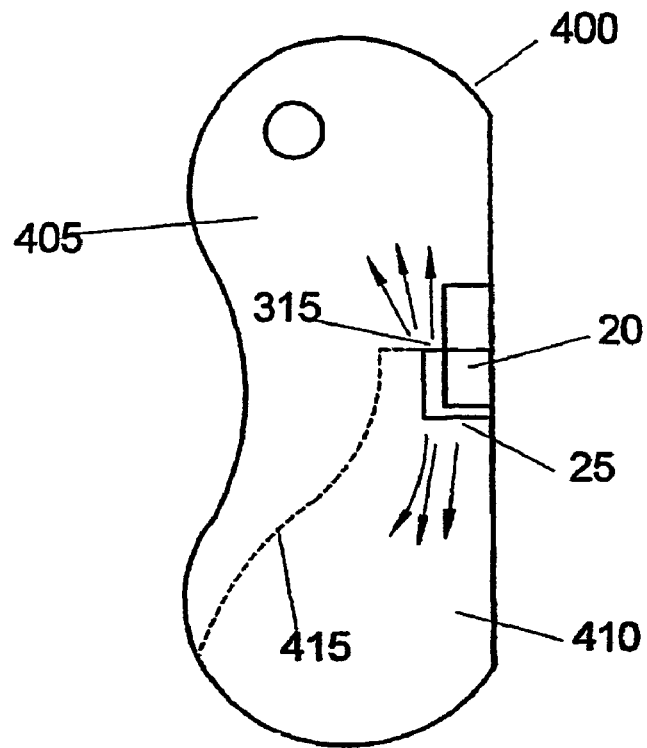
FIG. 8a shows a sectional view of a gas bag according to a sixth exemplary embodiment of the present invention.
Figure 8B:
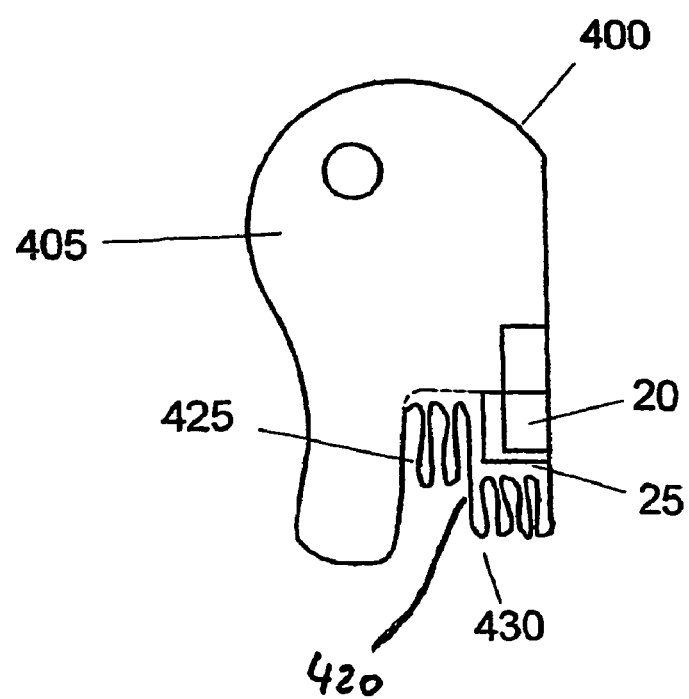
FIG. 8b shows a sectional view of a gas bag according to a sixth exemplary embodiment of the present invention.

A sixth exemplary embodiment of a gas bag according to the invention is illustrated in FIGS. 8a and 8b. The gas bag 400 has an upper gas bag chamber 405 and a lower gas bag chamber 410. The two gas chambers 405 and 410 are separated from each other, for example by means of a seam 415 or another type of separating point (for example an adhesive bonding point).

The envelope of the lower gas bag chamber 410 is arranged as a zigzag-folded envelope pack 420 partly immediately in front of the gas outlet opening 25 of the gas generator 20 and partly in a side pocket 425 of a filling channel 430.

Figure 9A:
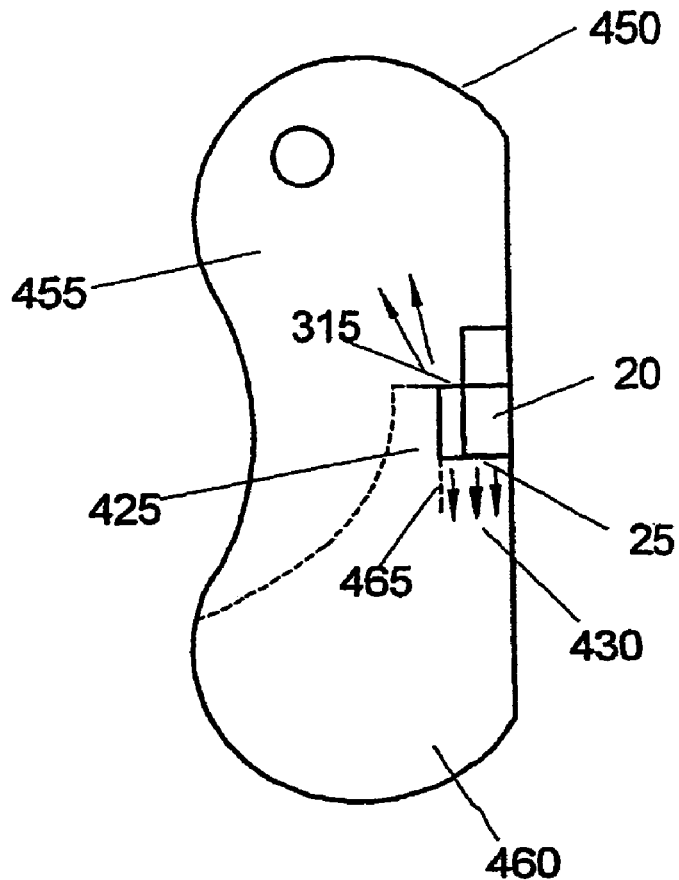
FIG. 9a shows a sectional view of a gas bag according to a seventh exemplary embodiment of the present invention.
Figure 9B:
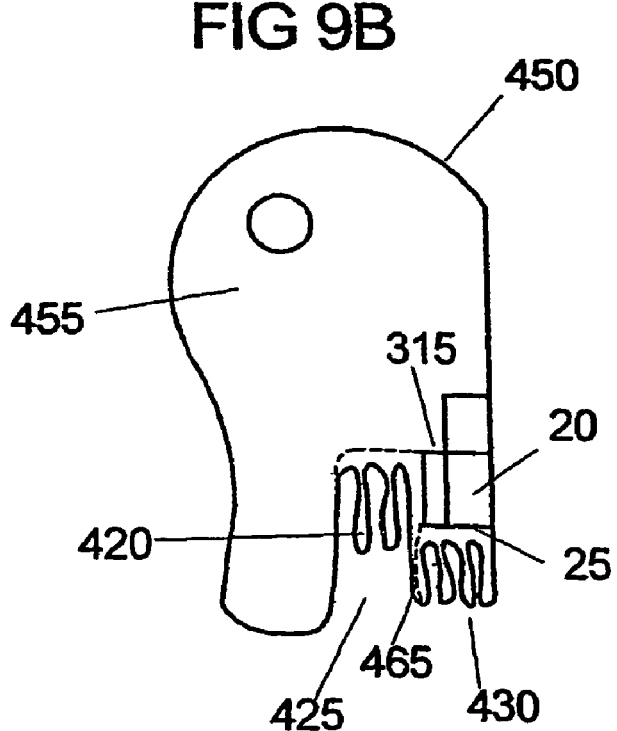
FIG. 9b shows a sectional view of a gas bag according to a seventh exemplary embodiment of the present invention.

FIGS. 9a and 9b show a seventh exemplary embodiment of a gas bag according to the invention. The gas bag 450 again has an upper gas bag chamber 455 and a lower gas bag chamber 460, which are separated from each other by a separator 465, for example a separating seam. The envelope of the lower gas bag chamber 460 is zigzag-folded as it is folded together and is accommodated as a zigzag-folded envelope pack 420 partly in a side pocket 425 and partly in a filling channel 430.

In summary, the seventh exemplary embodiment according to FIGS. 9a and 9b differs from the sixth exemplary embodiment according to FIGS. 8a and 8b in that the region of the side pocket 425 is separated from the remaining filling channel 430 by the separating seam 465.

Figure 10A:
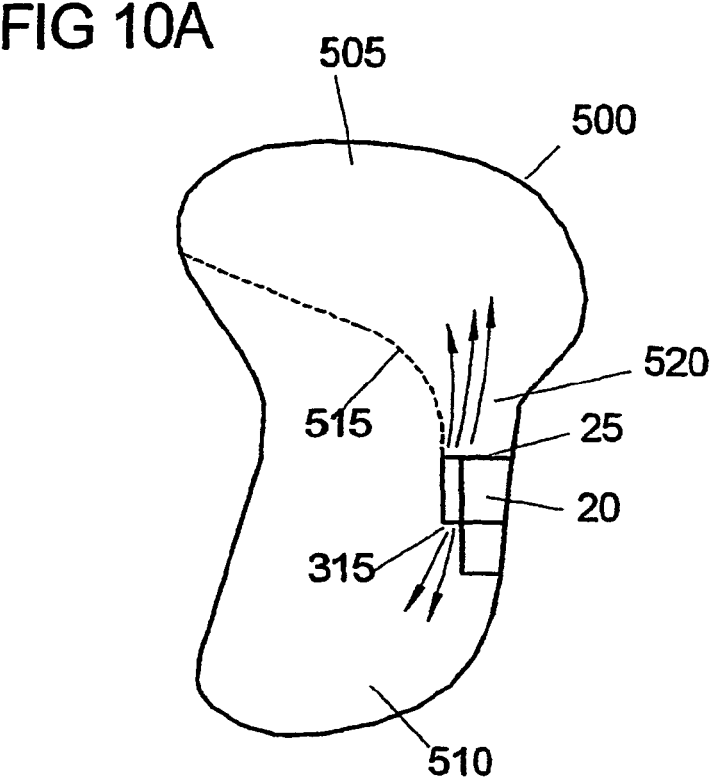
FIG. 10a shows a sectional view of a gas bag according to a eighth exemplary embodiment of the present invention.
Figure 10B:
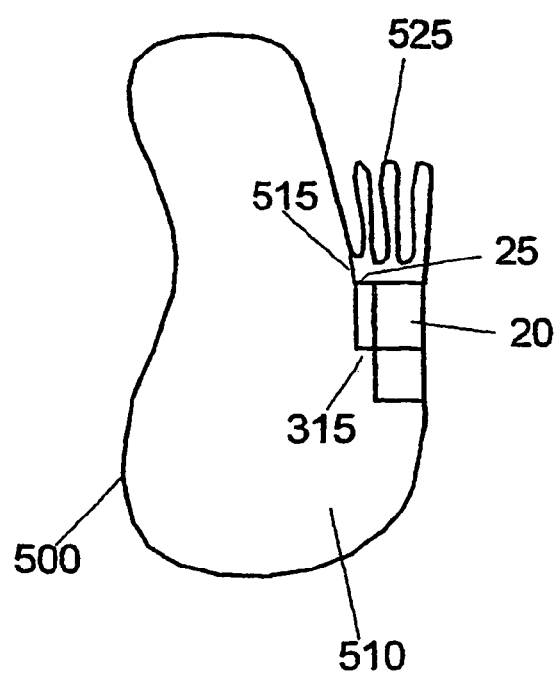
FIG. 10b shows a sectional view of a gas bag according to a eighth exemplary embodiment of the present invention.
Figure 11A:
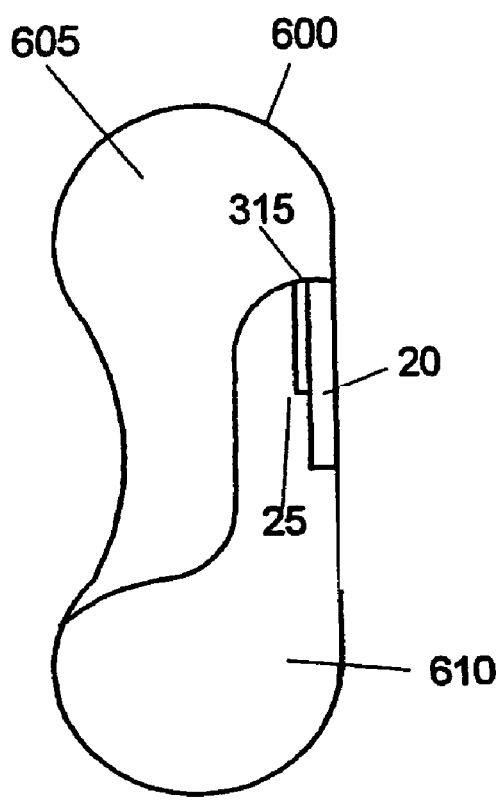
FIG. 11a shows a sectional view of a gas bag according to a ninth exemplary embodiment of the present invention.
Figure 11B:
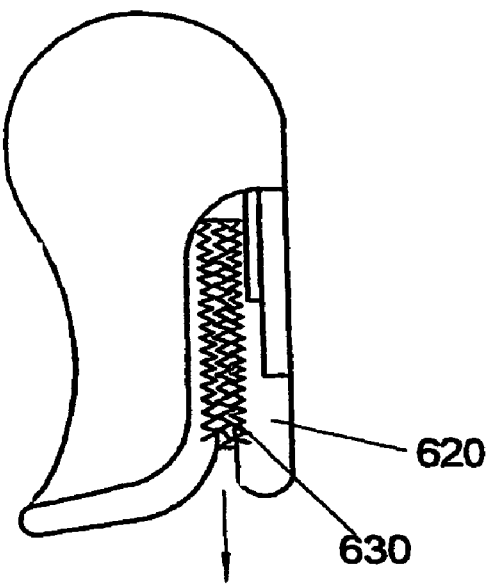
FIG. 11b shows a sectional view of a gas bag according to a ninth exemplary embodiment of the present invention.
Figure 11C:
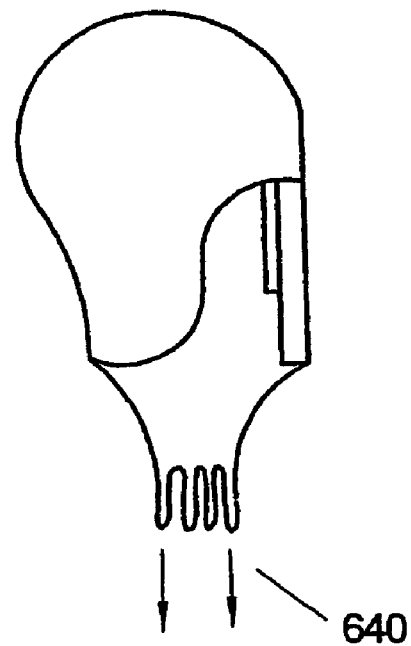
FIG. 11c shows a sectional view of a gas bag according to a ninth exemplary embodiment of the present invention.
Figure 11D:
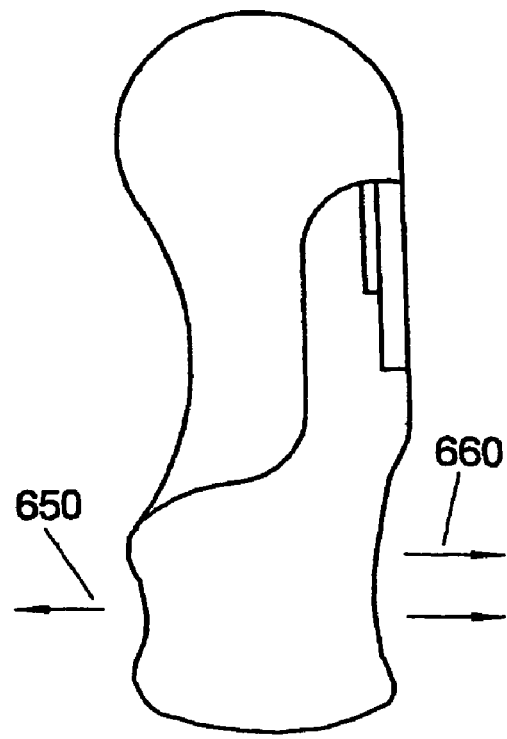
FIG. 11d shows a sectional view of a gas bag according to a ninth exemplary embodiment of the present invention.

FIGS. 10a and 10b illustrate an eighth exemplary embodiment of a gas bag according to the invention. The gas bag 500 is what is known as a head-thorax gas bag, which has a head chamber 505 as the upper chamber 505 and a lower chamber 510 as a thorax chamber. The two chambers 505 and 510 are separated by a separating point 515, for example a seam. In the upper chamber 505, a filling channel 520 is formed by the seam 515.

When the gas bag 500 according to FIGS. 10a and 10b is folded together, the upper chamber 505 is folded together to form an envelope pack 525, which is inserted into the filling channel 520.

If the gas generator 20 is activated, then gas emerges from the gas outlet opening 25 and catapults the envelope pack 525 out of the filling channel 520, so that the predefined deployment direction is achieved by means of the filling channel 520.

FIGS. 11a to 11d show a ninth exemplary embodiment of a gas bag 600 according to the invention. The gas bag comprises an upper chamber 605 and a lower chamber 610. The envelope pack 630 is stuffed into the filling channel 620 "unfolded". The arrows 640, 650 and 660 show the unfolding of the gas bag 600 upon activation of the gas generator 20.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. A passenger protecting system, comprising:
   a gas generator; and
   a gas bag including an envelope portion and a filling channel with a narrow portion which extends along a predefined deployment direction, wherein the narrow portion has a length greater than a width, wherein the system is configured so that inflation gas from the gas generator directly enters the filling channel;
   wherein at least part of the envelope portion is inserted into the narrow portion of the filling channel;
   wherein the part of the envelope portion that is inserted into the narrow portion of the filling channel is folded into an envelope pack, wherein the envelope pack is formed so that a long axis of the envelope pack is arranged perpendicularly to a width of the gas bag;
   wherein the envelope pack is folded together in a middle of the long axis of the envelope pack to form a U-shaped pack that is inserted into the narrow portion of the filling channel.

2. The system as claimed in claim 1, wherein the filling channel is connected to the gas generator.

3. The system as claimed in claim 1, wherein one end of the filling channel is adapted to be connected to the gas generator and the part of the envelope portion that is inserted into the narrow portion is located immediately in front of a connection point of the gas generator.

4. The system as claimed in claim 3, wherein the filling channel forms a side pocket which is located laterally beside the connection point of the gas generator.

5. The system as claimed in claim 1, wherein the part of the envelope portion that is inserted into the narrow portion is at least partly zigzag-folded, pleated and/or rolled together.

6. The system as claimed in claim 5, wherein the part of the envelope portion that is inserted into the narrow portion is zigzag-folded, pleated and/or rolled together at an end of the envelope facing away from the filling channel to form a zigzag-folded, pleated and/or rolled together envelope pack, wherein the envelope pack is folded together at least once to form the U-shaped pack.

7. The system as claimed in claim 1, wherein the gas bag has two or more gas bag chambers.

8. The system as claimed in claim 7, wherein the gas bag has at least one inner gas bag chamber that is surrounded by an outer gas bag chamber.

9. The system as claimed in claim 1, wherein the filling channel is formed laterally, at least partly, by a seam in the envelope of the gasbag.

10. The system as claimed in claim 7, wherein the filling channel is formed, at least partly, by side walls of associated gas bag chambers.

11. The system as claimed in claim 1, wherein the filling channel is formed, at least partly, by a diffuser layer fitted in the gas bag and/or by retaining straps.

12. The system as claimed in claim 1, wherein the filling channel is at least partly tubular.

13. The system as claimed in claim 12, wherein a cross section of the filling channel widens like a funnel at an open end of the filling channel.

14. The system as claimed in claim 1, wherein the gas bag is a pelvis-thorax gas bag that includes a pelvis region and a thorax region.

15. The system as claimed in claim 14, wherein the pelvis region of the gas bag is inserted into the filling channel.

16. The system as claimed in claim 14, wherein the gas bag is accommodated in a backrest of a motor vehicle seat so that the predefined deployment direction extends parallel to the backrest of the motor vehicle seat, in a direction of the vehicle seat area.

17. The system as claimed in claim 1, wherein the gas bag is a head-thorax gas bag that includes a head region and a thorax region.

18. The system as claimed in claim 17, wherein the head region of the gas bag is inserted into the filling channel.

19. The system as claimed in claim 17, wherein the gas bag is accommodated in a backrest of a motor vehicle seat so that the predefined deployment direction extends parallel to the backrest of the motor vehicle seat, in a direction of the vehicle roof.

20. The system as claimed in claim 1, wherein the gas bag is a head-thorax-pelvis gas bag that includes a head region, a thorax region, and a pelvis region.

21. The system as claimed in claim 20, wherein the head region and/or the pelvis region of the gas bag is in each case inserted into the filling channel.

22. The system as claimed in claim 21, wherein the gas bag is fitted in a backrest of a motor vehicle seat so that the predefined deployment direction of the filling channel for the head region extends parallel to the backrest of the motor vehicle seat, in a direction of the vehicle roof, and/or the predefined deployment direction of the filling channel for the pelvis region extends parallel to the backrest of the motor vehicle seat, in a direction of the vehicle seat area.

23. A method for folding a gas bag, comprising:
   inserting at least a part of a gas bag envelope of the gas bag into an envelope section of the gas bag envelope; and
   inserting the part of the gas bag envelope into a narrow portion of a filling channel, wherein the narrow portion has a length greater than a width;
   wherein the filling channel is party formed by the gas bag envelope;
   wherein the filling channel extends along a predefined deployment direction;
   wherein the part of the gas bag envelope that is inserted into the narrow portion of the filling channel is folded together into an envelope pack, wherein the envelope pack is formed so that a long axis of the envelope pack is arranged perpendicularly to a width of the bas bag;
   wherein the envelope pack is folded in a middle of the long axis of the envelope pack to form a U-shaped pack that is inserted into the narrow portion of the filling channel.

24. The method as claimed in claim 23, wherein the part of the gas bag envelope that is inserted into the narrow portion is at least partly zigzag-folded, pleated and/or rolled together.

25. The method as claimed in claim 24, wherein the part that is inserted is firstly zigzag-folded, pleated and/or rolled together at an end of the envelope facing away from the filling channel to form a zigzag-folded, pleated and/or rolled together envelope pack, wherein the envelope pack is folded together at least once to form the U-shaped pack.

26. A system for protecting passengers of a vehicle, comprising:
   a gas generator; and
   an air bag, including a folded section and a filling channel with a narrow portion, wherein the narrow portion has a length greater than a width;

wherein the filling channel is adjacent to the gas generator;

wherein the folded section is inserted in the narrow portion of the filling channel so that when inflation gas from the gas generator enter the filling channel, gas pressure builds up, expelling the folded section in a predetermined direction;

wherein the folded section that is inserted into the narrow portion of the filling channel is formed by a part of the air bag that is folded into an envelope pack, wherein the envelope pack is formed so that a long axis of the envelope pack is arranged perpendicularly to a width of the air bag;

wherein the envelope pack is folded together in a middle of the long axis of the envelope pack to form a U-shaped pack that is inserted into the narrow portion of the filling channel.

27. The system as claimed in claim 1, wherein the part of the envelope portion that forms the envelope pack is rolled to form the envelope pack.

28. The method as claimed in claim 23, wherein the part of the gas bag envelope that forms the envelope pack is rolled to form the envelope pack.

29. The system as claimed in claim 26, wherein the part of the air bag that forms the envelope pack is rolled to form the envelope pack.

30. The method as claimed in claim 23, wherein the envelope pack is folded before the envelope pack is inserted into the narrow portion of the filling channel.

* * * * *

UNITED STATES PATENT AND TRADEMARK OFFICE
CERTIFICATE OF CORRECTION

PATENT NO. : 7,594,677 B2  Page 1 of 1
APPLICATION NO. : 10/537709
DATED : September 29, 2009
INVENTOR(S) : Sendelbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this

Twenty-eighth Day of September, 2010

David J. Kappos
*Director of the United States Patent and Trademark Office*